United States Patent [19]

Sieving

[11] 4,286,825
[45] Sep. 1, 1981

[54] FABRICATED HEAVY-DUTY INDUSTRIAL WHEEL

[75] Inventor: Alfred W. Sieving, Venedy, Ill.

[73] Assignee: Caterpillar Tractor Co., Peoria, Ill.

[21] Appl. No.: 110,069

[22] Filed: Jan. 7, 1980

[51] Int. Cl.³ .......................... B60B 3/02; B60B 21/00
[52] U.S. Cl. .................................... 301/63 R; 301/97
[58] Field of Search ............ 301/63 R, 63 DD, 35 R, 301/95–97; 29/159.01, 159.1; 152/378, 381.3, 381.4; 113/116 D

[56] References Cited

U.S. PATENT DOCUMENTS

| 2,028,536 | 1/1936 | Eksergian | 301/97 |
| 2,057,565 | 10/1936 | Eksergian | 301/97 X |
| 2,083,325 | 6/1937 | Farr . | |
| 2,551,783 | 5/1951 | Ash | 301/97 X |
| 4,016,917 | 4/1977 | Victor . | |
| 4,088,372 | 5/1978 | Jewett et al. | 301/97 X |

FOREIGN PATENT DOCUMENTS 802878 10/1958 United Kingdom ...................... 301/97

Primary Examiner—Charles A. Marmor
Attorney, Agent, or Firm—John W. Grant

[57] ABSTRACT

A drop center rim (11) of a fabricated heavy-duty industrial wheel (10) is fabricated from several pieces welded together and includes a backup ring (19) positioned within and welded to the inner periphery of a rim well (13). In some embodiments, each of a pair of reinforcing rings (34,36) has an L-shaped cross sectional configuration with an axially extending portion (37) extending into and welded to the inner periphery of the rim well and a radially extending portion (38) having its outer edge welded to the respective bead seat (14,16) of the rim (11). An annular mounting flange (12) is connected to one of the reinforcing or backup rings and extends radially inwardly therefrom.

5 Claims, 5 Drawing Figures

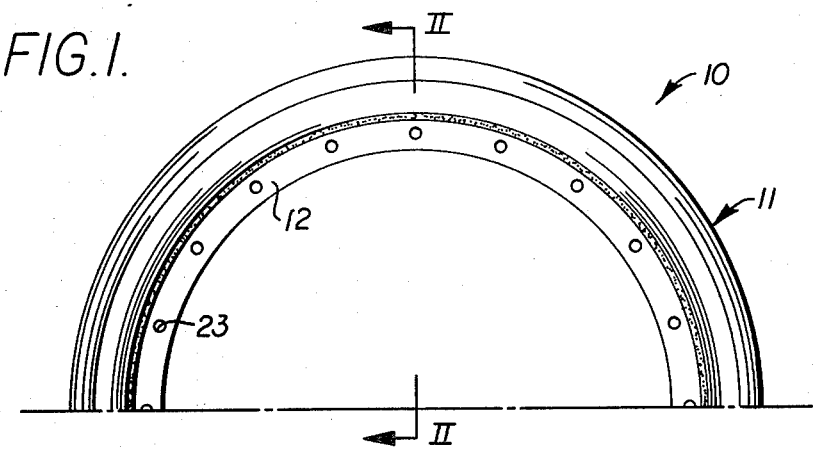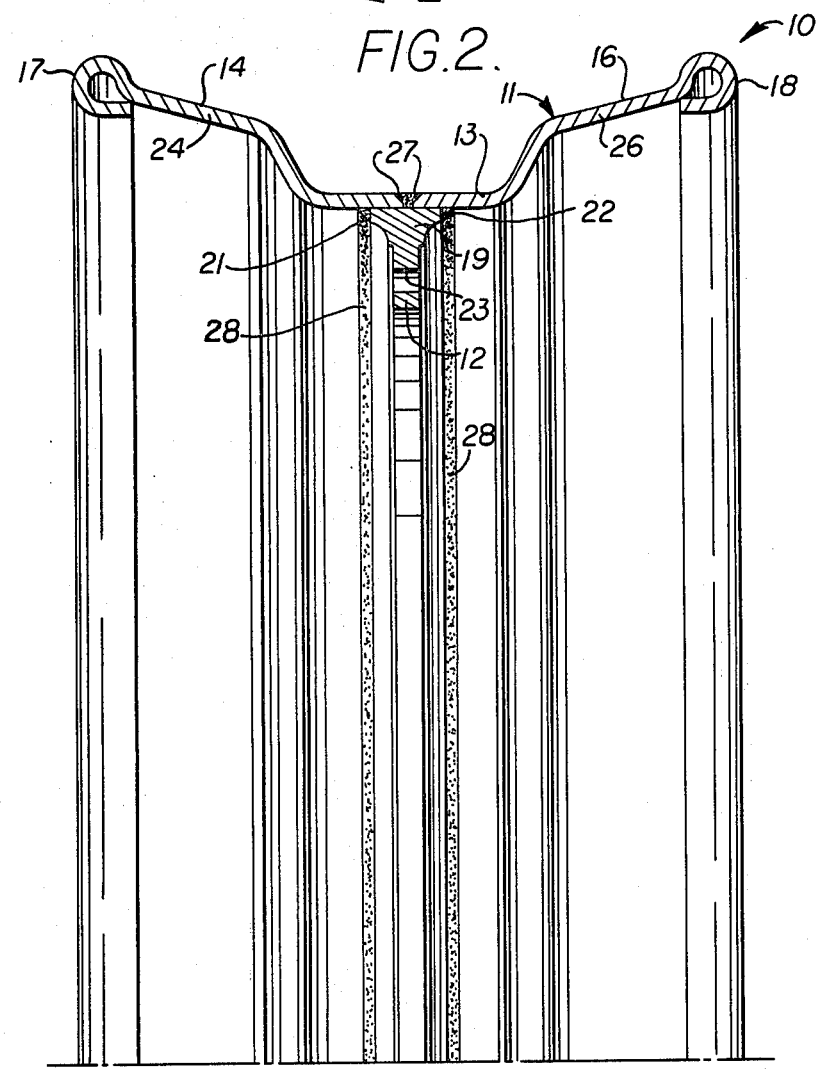

FABRICATED HEAVY-DUTY INDUSTRIAL WHEEL

DESCRIPTION

TECHNICAL FIELD

This invention relates generally to vehicle wheels and more particularly to a heavy-duty industrial wheel fabricated from several pieces.

BACKGROUND ART

Large earthmoving and industrial tires have traditionally been mounted on a multi-piece wheel. The rims of such wheels commonly have a removable bead seat and flange retained on a rim base by a split ring seated in a groove in the rim base. One of the problems frequently encountered therewith is that of sealing between the removable bead seat and the rim base for retaining air within the mounted tire.

There have been some recent endeavors to utilize the automotive type drop center wheel design for heavy-duty industrial tire use. Since the rims of automotive size wheels are relatively thin, they are easily made from one piece by spin forming. However, the massive size of the wheels and thickness of the material used for making the rims of earthmoving and industrial vehicles created problems in trying to use the same technology and construction for building such wheels. To make a drop center wheel of such size it became necessary to fabricate the wheel rims from two or more pieces which were welded together. A mounting flange was then welded to the fabricated wheel rim for use in mounting the wheel to a vehicle.

The present invention is directed to overcoming one or more of the problems as set forth above.

DISCLOSURE OF THE INVENTION

In one aspect of the present invention a fabricated heavy-duty industrial wheel of the type having a drop center rim with the rim having a rim well and a pair of bead seats positioned on opposite sides of the rim well includes a pair of reinforcing rings each having an L-shaped cross sectional configuration. Each ring has an axially extending leg portion extending into the inner periphery of the rim well and welded thereto and a radially extending leg portion having its outer edge welded to the respective bead seat. An annular mounting flange is connected to one of the reinforcing rings and extends radially inwardly therefrom.

BRIEF DESCRIPTION OF THE DRAWINGS

FIG. 1 is a diagrammatic partial plan view of an embodiment of the present invention.

FIG. 2 is a cross sectional view taken along line II—II of FIG. 1.

BEST MODE FOR CARRYING OUT THE INVENTION

Figure 3:
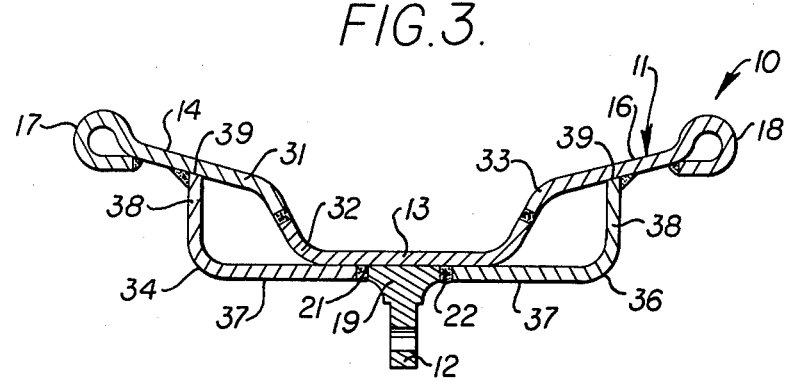
FIGS. 3, 4 and 5 are cross sectional views of other embodiments of the present invention.

Referring now to FIGS. 1 and 2 of the drawings, an embodiment of a fabricated heavy-duty industrial wheel 10 includes a drop center rim 11 and a mounting flange 12. The drop center rim includes a rim well 13, a pair of 15° bead seats 14,16 and a pair of flanges 17,18 at the outboard sides of the rim. The mounting flange 12 is an integral part of and extends radially inwardly from a ring 19 having opposite axial ends 21,22. The mounting flange has a plurality of holes 23 extending therethrough.

The drop center rim 11 is constructed from a pair of identical rim halves 24,26 seated on the ring 19. The rim halves have inner ends 27 welded to each other and to the ring 19 at the approximate mid-portion thereof. The ring 19 functions as a backup member or bridge for the weld. The axial ends 21,22 of the ring 19 are welded to the respective rim half 24,26 by a continuous weld seam 28. Each of the flanges 17,18 have a substantially circular cross sectional shape for strengthening purposes. The rim halves 24,26 are preferably made by spin forming.

FIG. 3 discloses another embodiment which is a variation of the embodiment of FIGS. 1 and 2. Accordingly only the additional elements will be described in detail with the same reference numerals of the first embodiment used to designate similar counterpart elements of this embodiment. In this embodiment, however, the rim 11 is fabricated from three pieces 31,32,33 with the two outside pieces 31,33 being welded to the center piece 32. A pair of reinforcing rings 34,36 are welded to the radial inner surface of the rim 11 for increased strength. Preferably each of the reinforcing rings 34,36 has an L-shaped cross sectional configuration with an axially extending leg portion 37 and a radially extending leg portion 38. The axially extending leg portion 37 extends into the inner periphery of the rim well 13 and is welded thereto and to the respective axial end 21,22 of the ring 19. An outer edge 39 of each radially extending leg portion 38 is welded to the respective bead seat 14,16.

Although the mounting flange 12 is shown at the center of the ring 19 it can be offset axially thereof.

Figure 4:
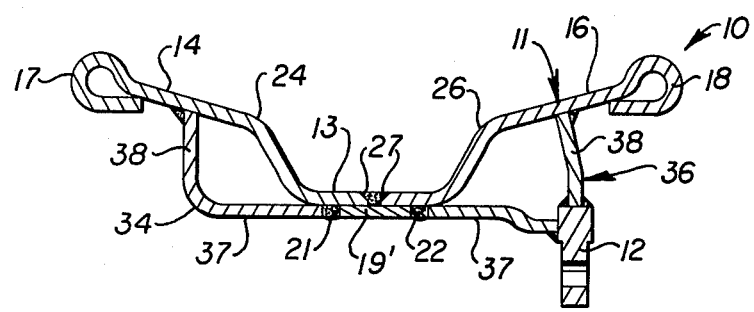

FIG. 4 discloses another embodiment of a fabricated heavy-duty industrial wheel 10. In this embodiment, however, the inner ends 27 of the rim halves 24,26 are welded to each other and to a backup ring 19' which is independent of the mounting flange 12. The axial ends 21,22 of the backup ring 19' are welded to the respective rim half 24,26 and to the axially extending leg portions 37 of the reinforcing rings 34,36. The reinforcing ring 36 is a fabricated subassembly having the mounting flange 12 welded therein. The outboard end of the axially extending leg portion 37 is welded to a side surface of the mounting flange 12 and the inner edge of the radially extending leg portion 38 is welded to the outer edge of the mounting flange.

Figure 5:
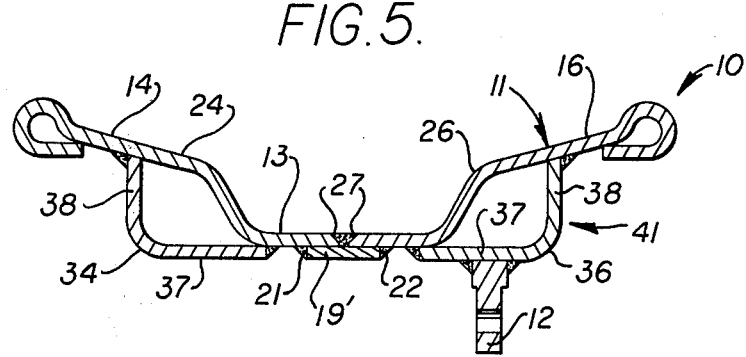

FIG. 5 discloses another embodiment of a fabricated heavy-duty industrial wheel 10. In this embodiment the inner ends 27 of the rim halves 24,26 are welded to each other and to the backup ring 19'. The axial ends 21,22 of the ring 19' are welded to the respective rim half 24,26. The ends of the axially extending leg portions 37 are welded to the rim 11 at a position spaced from the axial ends of the ring 19'. The rim halves 24,26, ring 19' and reinforcing rings 34,36 are welded together as a rim assembly 41 to which the mounting flange 12 is welded. Preferably, the mounting flange 12 is welded to the axially extending leg portion 37 of reinforcing ring 36 at a position inboard of the radially extending leg portion 38.

Other aspects, objects and advantages of this invention can be obtained from a study of the drawings, the disclosure and the appended claims.

What is claimed is:

1. In a fabricated heavy-duty industrial wheel (10) of the type having a drop center rim (11), said rim (11)

having a rim well (13) and a pair of bead seats (14,16) positioned on opposite sides of the rim well, the improvement comprising:
- a pair of reinforcing rings (34,36) each having an L-shaped cross sectional configuration with an axially extending portion (37) extending into the inner periphery of the rim well (13) and welded thereto and a radially extending portion (38) having its outer edge (39) welded to the respective bead seat;
- an annular mounting flange (12) connected to one of the reinforcing rings (34,36) and extending radially inwardly therefrom; and
- wherein said rim (11) is constructed from a backup ring (19) and a pair of identical halves (24,26) seated on said backup ring (19), the halves having inner ends (27) welded to each other and to the backup ring (19), said backup ring (19) having its outer ends (21,22) welded to the rim well (13) of the rim (11).

2. The fabricated wheel (10) of claim 1 wherein said mounting flange (12) is welded into one reinforcing ring (36) as part of a fabricated subassembly.

3. The fabricated wheel (10) of claim 1 wherein said mounting flange (12) is welded to the axially extending portion (37) of the one reinforcing ring (36) and is positioned inboard of the radially extending portion (38).

4. The fabricated wheel (10) of claim 1 wherein said backup ring (19) is positioned between the axially extending portions (37) of the reinforcing rings (34,36).

5. A fabricated heavy-duty industrial wheel (10) comprising:
- an annular ring (19) having outer ends (21,22);
- a drop center rim (11) having a rim well (13) and a pair of bead seats (14,16) positioned at opposite sides of the rim well, said rim (11) being constructed from a pair of identical rim halves (24,26) seated on said annular ring (19), the halves having inner ends (27) welded to each other and to the annular ring (19), each of said outer (21,22) ends of said ring being welded to the respective rim half by a continuous weld (28);
- a pair of reinforcing rings (34,36) each having an L-shaped cross sectional configuration with an axially extending portion (37) extending into the inner periphery of the rim well (13) and welded thereto and a radially extending portion (38) having its outer edge welded (39) to the respective bead seat and a mounting flange (12) connected to said wheel and extending radially inwardly therefrom.

* * * * *